United States Patent [19]

Penn

[11] 4,357,543
[45] Nov. 2, 1982

[54] WAVE-MOTOR SYSTEM

[76] Inventor: James F. Penn, 560 Carolina Ave., Chester, W. Va. 26034

[21] Appl. No.: 208,991

[22] Filed: Nov. 21, 1980

[51] Int. Cl.³ .......................... C25B 1/04; F03B 13/12
[52] U.S. Cl. ..................................... 290/53; 290/42; 60/499; 60/506; 204/129
[58] Field of Search ................... 290/42, 53; 417/100, 417/330–333, 337; 60/495, 496, 499, 500–502, 506, 639, 640; 204/129

[56] References Cited

U.S. PATENT DOCUMENTS

| | | | |
|---|---|---|---|
| 1,796,618 | 3/1931 | Peterson | 417/330 |
| 3,754,147 | 8/1973 | Hancock et al. | 290/1 |
| 4,172,689 | 10/1979 | Thorsheim | 290/42 |
| 4,189,918 | 2/1980 | Moody et al. | 417/330 |
| 4,231,711 | 11/1980 | MacGregor | 60/499 |
| 4,296,602 | 10/1981 | Hales et al. | 60/639 |

*Primary Examiner*—B. Dobeck
*Assistant Examiner*—Shelley Wade
*Attorney, Agent, or Firm*—William Preston Hickey

[57] ABSTRACT

A wave motor comprising flotation means, a ramp carried by said flotation means to convert waves into breakers and means to cause the water in approximately the top half of the breakers to be moving horizontally forward at the time of impact against an energy conversion vane. The vane drives an electric generator that produces a pulsating D.C. current voltage basically the same frequency as that of the sea waves and an electrolytic cell driven by said generator produces hydrogen at the pulsing frequency of the sea waves.

13 Claims, 4 Drawing Figures

WAVE-MOTOR SYSTEM

TECHNICAL FIELD

The present invention relates to method and means for converting the energy of sea waves to useful work.

BACKGROUND OF THE INVENTION

It is known that the water within sea waves or swells normally heaves and falls in a generally circular motion, and that the lateral movement of such swirling water during each wave cycle is only about 1% of the height of the wave. The art has long proposed apparatus for utilizing the energy of sea waves, and most of this art utilizes the vertical component, or heave and fall, of the wave to actuate its energy transforming mechanism.

The problem involved in trying to harness the energy of the sea is complicated by the fact that sea waves are highly pulsating and eratic. The sea waves at any one location will vary from hour to hour, not only in height and direction, but in frequency; and the change in frequency may be considerable.

Another problem that is involved in the problem of transporting the work done by a wave at sea to a distant point, usually on shore where the need exists for the energy. It may be possible to convert the wave motion into a continuous uniform mechanical motion, as by a flywheel effect, and to drive an electrical generator from the flywheel to produce a uniform A.C. or D.C. current that can be utilized by conventional electrical machinery; but to my knowledge, this has never been done commercially because of the problems in gaining uniform motion and syncronizing such a system with a shore based installation.

Accordingly it is an object of the present invention to provide a practical system for converting the energy of sea waves into a form of useful energy that can be stored at sea; and so that the energy conversion system can be located miles at sea without a direct connection to the shore.

Another object of the invention is the provision of a new and improved energy conversion unit that converts a wave to a breaker and utilizes water flow from the top of the breaker back to the surface of the water to produce mechanical work.

Still another object of the invention is the provision of a new and improved energy conversion unit that is totally supported by flotation means, and which includes means for offsetting the buoyancy of a crest prior to the crest entering the energy conversion unit.

Still other objects and advantages of the invention will become apparent to those skilled in the art to which the invention relates from the following description of the preferred embodiments described with reference to the accompanying drawings.

DESCRIPTION OF PREFERRED EMBODIMENTS

Figure 2:
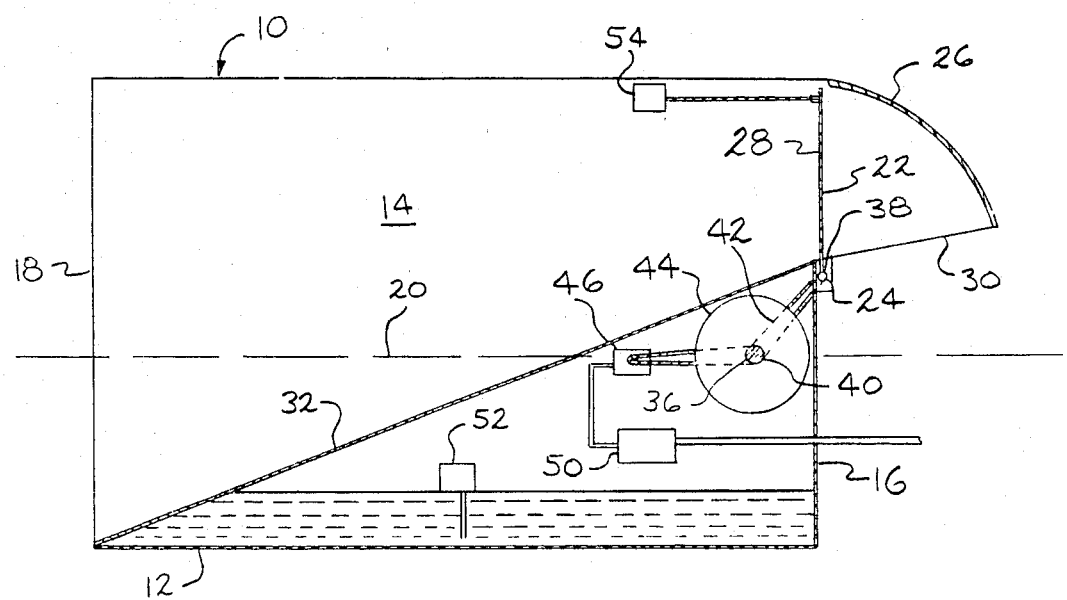
FIG. 2 is a schematic sectional view of the barge shown in FIG. 1.

The total energy contained in sea waves is said to be calculated by the following equation:

$$E = wLH^2/8$$

Where: $w = 64$ lbs./ft.$^3$; $H$ = height; $L$ = wave length. It will be seen therefore that waves 4 feet high, having a wave length of 30 feet, may contain 3850 foot pounds of energy per foot of wave, or approximately 46,200 foot pounds/minute.

As previously stated it is known that the water adjacent its surface is moved in a generally circular orbit as a wave passes by. This means that the water following the wave trough moves upwardly and backwardly, then upwardly and forwardly as the crest passes, followed by a return to its starting point as the next trough approaches. During each wave cycle the water that moved in the circular orbit ends up displaced laterally by approximately 1% of the height of the wave. It will be seen therefore that the net lateral movement in waves is negligible, and this explains why most prior art devices utilize the heave and fall of the wave to drive energy transforming mechanisms.

It is known however that the water in approximately the top half of "breakers" all moves laterally at the speed of the wave. It is also known that the speed of waves slows down to approximately ⅓ of the velocity of the swells which are transformed into breakers, and that the energy of the wave is somehow transformed to propell a greater amount of water forwardly but at this reduced speed. It is further known that breakers are produced when the bottom surface is approximately 1.3 times the height of the wave below the trough of the wave. In nature, the exact location of such a transformation varies with each wave, and irratically extends over a varying distance from shore.

According to principles of the present invention a rather steeply rising ramp is positioned beneath the surface of the water at a depth to produce a "breaker" at a generally fixed location along the ramp. An energy transforming surface is positioned at a fixed location to be moved by the impact of the forwardly moving water of the wave, and to be moved over an energy absorbing distance during which the water remains piled against the surface. In order to accomplish this, the top part of the ramp is preferably located approximately 1.3 times, or less, of the height of the wave from the surface at the trough of a wave; so that the bulk of the orbiting water rides up the ramp and does not pass beneath the ramp. By so locating the ramp, a major portion of the orbiting energy of the wave is transformed into forwardly moving water, and the orbiting motion is greatly reduced. At the same time the height of the wave increases approximately 20% or more with the water in the major portion of the wave moving forwardly. By positioning an impact vane above the trough of the wave, it can be kept out of the path of rearwardly moving water and maximium of kinetic energy can be absorbed from the water.

It will be seen that the energy given up from breakers will occur at a greatly reduced velocity from that of the initial wave, and can be made to release its energy over a relatively short distance compared to the original wave length. By having a vane move free of the water after passing this relatively short distance, a minimum of energy will be lost in returning the vane to its starting position. In a preferred arrangement, several devices would be positioned side by side.

According to other principles of the present invention, a wave energy conversion system is supported by a flotation system that can be towed to sea where the wave energy is converted to another storable form of energy, such as compressed hydrogen, which can be collected at intervals and transported to shore. The energy of the sea waves is first converted into pulsating mechanical energy. The pulsating energy may or may not be smoothened by a flywheel effect, and is converted to a D.C. voltage that is used in an electrolytic cell, the operation of which can utilize a pulsating D.C. voltage. Thereafter, the liberated hydrogen is compressed and stored in containers which can be collected periodically. Such a system overcomes the mechanical problems of trying to produce a continuous flow of energy from the highly erratic, pulsating sea waves, and of trying to synchronize A.C. voltages and of transporting D.C. voltages over an appreciable distance.

Figure 1:
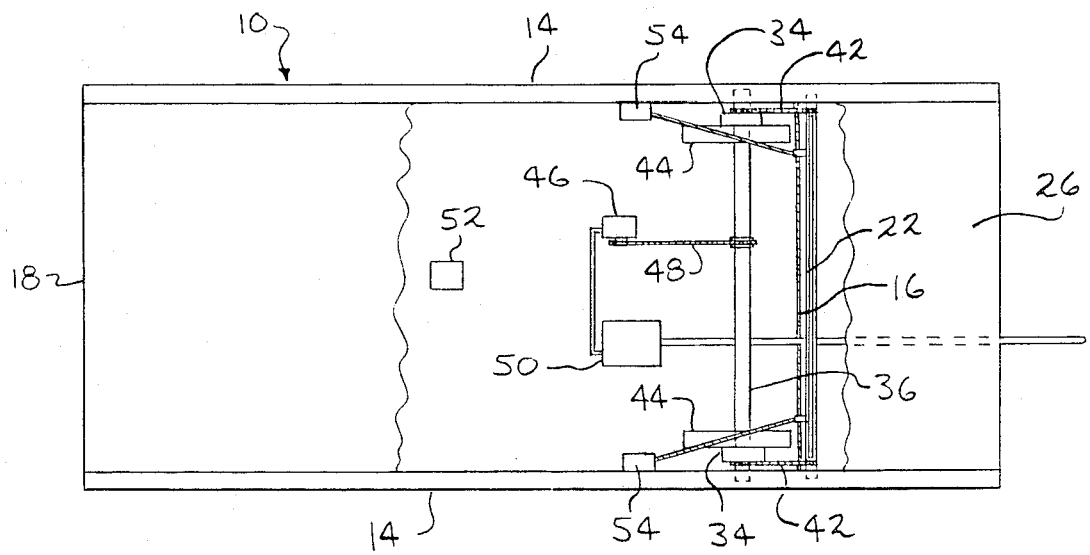
FIG. 1 is a schematic plan view of a sea going barge embodying principles of the present invention.

FIGS. 1 and 2 of the drawings are a schematic depiction of a barge adapted to be towed to sea for converting wave energy into another useful form of energy. The barge 10 has a bottom 12, closed sides 14, a partial rear wall 16, and an open front 18. The barge is intended to float in the water so that the water line 20 is at or beneath the top of the partial rear wall 16. A water impact vane 22 extends across the barge above the partial rear wall 16 and is supported by a rock shaft 24 that is journaled at its opposite ends to the opposite sides of the barge. The rock shaft 24 is located adjacent the top of the partial rear wall 16 so that the water impact vane 22 can rotate from a vertical position extending upwardly of the partial rear wall 16 down to the water line 20. A curved plate 26 extends from the vertical position of the water impact vane to a location above the water line 20 to retain water onto the vane. The sides of the barge extend along both sides of the vane so that water is confined to the vane 22 from a curved passageway extending from its entrance 28 at the vertical position of the vane to its exit 30 that is adjacent or slightly above the water line.

Water is conducted to the water impact vane 22 by an inclined ramp 32 that extends from the front of the barge to the top of the partial rear wall 16. Waves entering the open front of the barge are slowed and converted to breakers as they ride up the ramp to change the circulatory movement of the water to a predominantly linear movement before reaching the impact vane 22. The impact of the breaker on the vane causes it to rotate down to the water line. The water from the breaker is held onto the vane by the sides 14 and curved plate 26. Because the wave is slowed by the ramp, the crest of the wave outside of the barge passes the barge while the breaker is in the barge, and the next valley of the waves outside of the barge is at or near the exit 30 at the time that the vane is ready to discharge. The water line therefore need not be as far below the vane 22 as shown in the drawings.

The rocking action of the rock shaft 24 is converted to rotary movement of a shaft 36 by a pair of one way drive mechanisms 34 respective members of which are located at opposite sides of the barge. Each one way drive mechanism comprises a sprocket 38 on the rock shaft 24, a sprocket 40 on the shaft 36, and an interconnecting endless chain 42. The movement of rock shaft 24 is highly pulsating and this is smoothened somewhat by providing a pair of flyheels 44 on the shaft 36.

The rotary motion of the shaft 36 is converted to electrical energy by means of a D.C. generator 46 driven by an endless chain 48 and suitable sprockets on the generator and shaft. The D.C. electricity will be pulsating and vary somewhat in voltage.

According to principles of the present invention, this irregular voltage is transformed into hydrogen and oxygen insitu by means of an electrolytic cell 50 within the barge itself. The electrolytic cell is of conventional construction but preferably includes an accumulator for hydrogen, not shown, and a compressor with suitable controls for taking the hydrogen from the accumulator and compressing it to a storage pressure of say at least 1000 psi. The compressor, not shown, is preferably driven by a endless chain and sprockets from the shaft 36 so that its output is automatically proportional to the hydrogen produced.

The position of the water line relative to the water impact vane 22 is preferably controlled in relation to the size of the waves, so as to get maximum performance and still prevent damage by excessively high seas. This is accomplished by lowering the water line so that only the tops of the breakers enter the entrance 28. This can be done in a number of ways, as for example, by an integrating float chamber located on the side of the barge. Water enters the float chamber quickly through a check valve, and exits the float chamber through a control orifice. The water level in the float chamber will therefore correspond to the height of the breakers impacting upon the water impact vane 22. Suitable controls are provided the electrically driven water pump 52 and when the float level gets too high, the pump 52 is actuated to remove water ballast from the bottom of the barge. On the other hand, when the float level is too low, a sea cock, not shown, is opened to add ballast and raise the water line relative to the vane 22.

After the vane 22 is forced down to the water line it may be returned by various means. Some sort of counter-balance is desireable. In addition, a positive return of the vane to its upright position is highly desireable. This can be accomplished by trip dogs on the endless chain 42 which engage the actuating lever of a hydraulic valve, not shown, which supplies hydraulic pressure to a pair of hydraulic winches 54 respective ones of which are located on opposite sides of the barge. When the chain 42 is in a position corresponding to the lower position of the vane 22, one dog actuates the control lever of the valve to supply pressure to the winches 54, and when the vane is in its vertical position, another dog on the chain 42 closes the valve to stop the winches.

Another embodiment for raising the impact vane utilizes a mechanical drive from the shaft 36. A cross shaft, not shown, parallels the rock shaft 36, and the two shafts are interconnected by suitable spur gears. Another one way drive connects the cross shaft, not shown, and the rock shaft 24. This one way drive is actuated by trip dogs similar to that described for actuating the winches 54.

Figure 3:
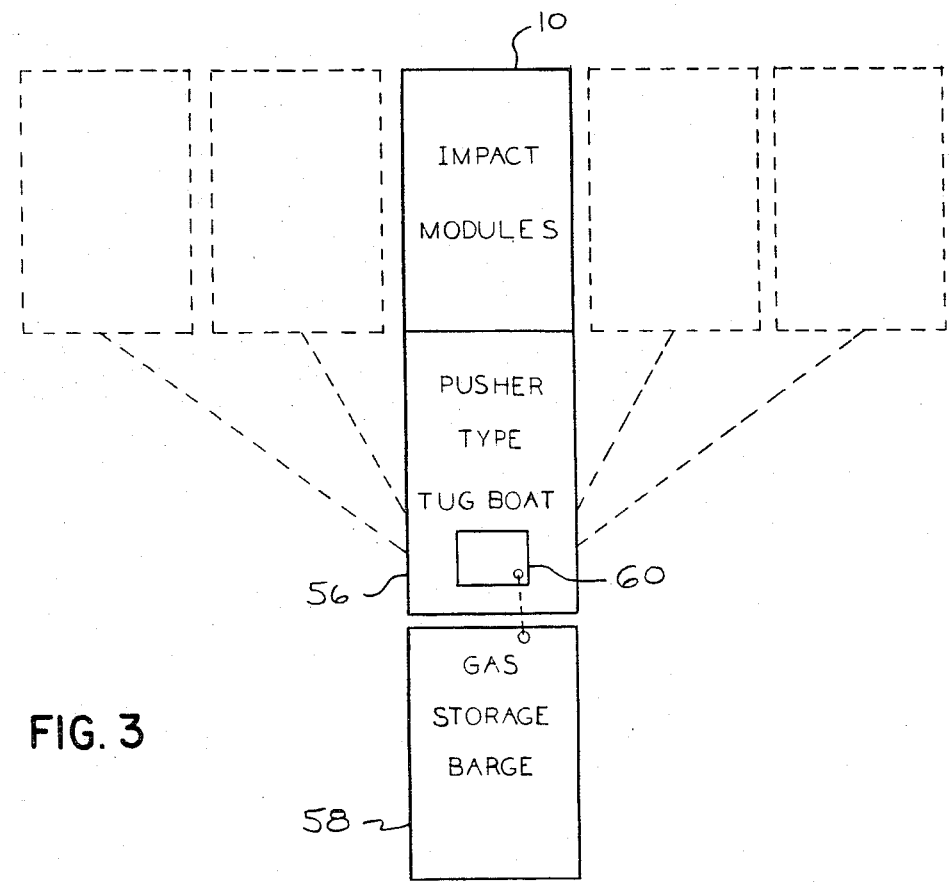
FIG. 3 is a schematic plan view of an assembly of the barges of the present invention being pushed by a tug.
Figure 4:
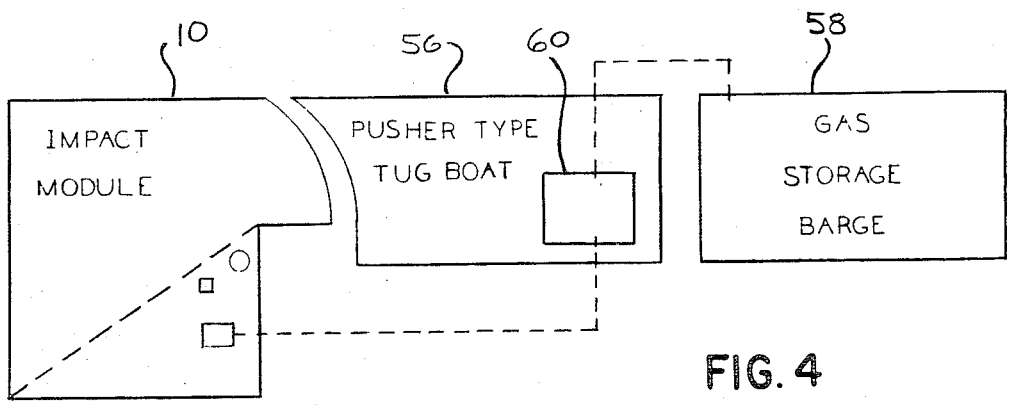
FIG. 4 is a schematic side view of the assembly depicted in FIG. 3.

FIGS. 3 and 4 of the drawings show a plurality of the barges 10 being coupled together and moved to sea by a pusher type tug 56. In some instances the tug 56 may stay with the barges, or the barges may be anchored at sea and the tug 56 may be only used for moving the barges to and from shore and for collecting the compressed hydrogen. The tug 56 has a storage barge 58 towed behind for storing the hydrogen at high pressure.

The tug 56 preferably has gas handling equipment 60 on board for transfering the hydrogen from the barges 10 to the storage barge 58 for movement of the hydrogen to shore. It will also be understood that a similar but smaller system is provided for compressing and moving the oxygen that is produced by the electrolytic cells 50 to the storage barge 56.

It will be apparent that there has been provided a new and improved system which causes waves of a design height to form breakers from which a maximum of energy is extracted. As the waves exceed the design height, the conversion to breakers lessens and simultaneously therewith more of the wave passes under the ramp. This reduces the energy impact on the device on two counts, so that the device can withstand seas greatly in excess of the design height. Also the ramp 32 acts as a vane to cause a wave to provide a downward force generally offsetting its buoyant force on the hull. In some instances an addition vane can be provided just beneath the water level to increase the downward force of a wave passing the hull.

While the invention has been described in considerable detail, I do not wish to be limited to the particular embodiments shown and described, and it is my intention to cover hereby all adaptations, modifications and arrangements thereof which come within the practice of those skilled in the art to which the invention relates and which fall within the purview of the following claims.

I claim:

1. A machine for converting energy of sea waves to useful work comprising: flotation means, an energy conversion device having an impact vane positioned generally above the surface of the low point of the waves and a discharge to the water surface, said device being actuated by water impacting on said vane and forcing it down to the surface of the water on the discharge side of said device, a ramp carried by said flotation means and constructed and arranged to convert waves into breakers, and means for raising and lowering said flotation means in the water to cause the water in approximately the top half of the breakers to be moving generally horizontally forward at the time they impact against said vane of said energy conversion device.

2. The machine of claim 1 wherein said energy conversion device comprises: an impact panel hinged at the bottom about a horizontal axis for movement from a generally vertical position to a generally horizontal position by water moving from said inlet down to the surface of the water at said discharge.

3. The machine of claim 1 wherein said impact vane drives an electric generator for producing a pulsating D.C. voltage the frequency of which is basically that of the sea waves, an electrolytic cell driven by said generator for producing hydrogen at the pulsing frequency of the sea waves, and accumulator means for said hydrogen which will smooth out the pulsations of hydrogen.

4. A machine for converting energy of sea waves to useful work comprising: flotation means relative to which the surface of the surrounding water rises and falls as the crests and valleys of waves move therepast; an energy conversion device having an impact vane supported from said flotation means above the valleys of waves passing the flotation means and a discharge to the water surface of walleys flowing therepast, said device being actuated by water flowing from said impact vane down to the surface of the water on the discharge side of said device; and an inclined ramp carried by said flotation means ahead of said impact vane and over which waves pass before impacting said vane, said ramp being constructued and arranged to produce a generally maximum wave height at said impact vane and to hold said flotation means down when said maximum height impacts said vane and to rise as the water of the wave moves said impact vane.

5. A method of transforming the energy of sea waves into a readily available stored form of energy comprising: transforming sea waves into a pulsating form of electrical energy the pulses of which are at the frequency of the sea waves; passing the pulsating electrical current through electrolysis means for the sea water to produce hydrogen the pulses of which are at the frequency of the sea waves; and accumulating and smoothening out the pulsing flow of hydrogen.

6. A method of transforming the energy of sea waves into a readily available stored form of energy comprising: transforming sea waves into a pulsating form of mechanical energy the pulses of which are at the frequency of the sea waves; transforming part of the pulsating form of mechanical energy into a pulsating electrical current the pulses of which are at the frequency of the sea waves; passing the pulsating electrical current through electrolysis means for the sea water to produce a pulsating flow of hydrogen the pulses of which are at the frequency of the sea waves; accumulating and smoothening out the pulsing flow of hydrogen; and compressing the hydrogen into a high pressure storage system utilizing another part of said pulsating mechanical emergy.

7. A method of converting the energy of sea waves into useful mechanical work, comprising: providing flotation means the rise and fall of which is considerably less than the vertical distance between the water surface of crests and valleys passing the flotation means: providing an energy conversion unit on said flotation means with an impact vane located above the surface of the valleys passing said flotation means and with said energy conversion unit producing mechanical work as water moves said impact vane; and causing crests approaching said conversion unit to be converted into breakers that have approximately the top half of the water therein moving generally horizontally forward at the point where they impact said impact vane of said energy conversion unit.

8. The method of claim 7 including the further step of: utilizing the movement of a wave as it approaches said impact vane to produce a force on said flotation means which reduces the flotation effect of a crest adjacent said water impact vane.

9. Apparatus for converting energy of sea waves to useful work comprising: an impact vane moveable from a generally vertical position to a generally horizontal position; a ramp beneath the water level and leading upwardly to said impact vane and constructed and arranged to convert the sea waves into breakers; and means for raising and lowering said ramp so that the breakers have approximately the top half of the water therein moving generally horizontally forward at the point where said impact vane is in its generally vertical position.

10. The apparatus of claim 9 wherein said ramp and impact vane are supported by a flotation device using water as a ballast; and said means adds water to or takes water out of said ballast.

11. The apparatus of claim 10 wherein said flotation device comprises twin hulls respective ones of which are located on opposite sides of said impact vane.

12. Apparatus for converting energy of sea waves to useful work comprising: flotation means adapted to be raised and lowered relative to a normal water line by adding water to and removing water therefrom, said flotation means having sidewalls, an open front, and a rear wall extending from a point below the normal water line to a point above the normal water line; an impact vane hinged about a horizontal axis adjacent the top of said rear wall for movement between a generally vertical position and a horizontal position; and a ramp extending from a point beneath the normal water line and adjacent the front end of said flotation means angularly upwardly to a point adjacent the top of said rear wall, said ramp being carried by said flotation means for raising and lowering relative to said normal water line.

13. The apparatus of claim 12 having a curved vane cover fixed to said flotation means for confining water to said vane as it moves from its vertical position to a generally horizontal position.

* * * * *